(12) United States Patent
Coverdill et al.

(10) Patent No.: US 7,496,659 B1
(45) Date of Patent: Feb. 24, 2009

(54) METHOD AND APPARATUS FOR MONITORING THE AVAILABILITY OF NETWORK RESOURCES

(75) Inventors: Mark Coverdill, Dublin, OH (US); Jonathan Gohstand, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1072 days.

(21) Appl. No.: 10/636,144

(22) Filed: Aug. 6, 2003

(51) Int. Cl.
*G06F 15/173* (2006.01)

(52) U.S. Cl. .................. 709/224; 709/208; 370/252

(58) Field of Classification Search ............... 709/223, 709/219, 224, 203, 208; 714/23; 370/342, 370/248, 252, 395.52; 455/561
See application file for complete search history.

(56) References Cited

U.S. PATENT DOCUMENTS

| | | | |
|---|---|---|---|
| 6,711,137 B1 * | 3/2004 | Klassen et al. ............. | 370/252 |
| 6,834,302 B1 * | 12/2004 | Harvell ..................... | 709/224 |
| 6,885,641 B1 * | 4/2005 | Chan et al. ................ | 370/252 |
| 6,976,071 B1 * | 12/2005 | Donzis et al. ............. | 709/224 |
| 6,993,681 B2 * | 1/2006 | Haynes et al. ............. | 714/23 |
| 7,124,173 B2 * | 10/2006 | Moriarty ................... | 709/219 |
| 7,167,912 B1 * | 1/2007 | Dhingra .................... | 709/223 |
| 7,260,066 B2 * | 8/2007 | Wang et al. ............... | 370/248 |
| 2002/0160812 A1 * | 10/2002 | Moshiri-Tafreshi et al. . | 455/561 |
| 2002/0169861 A1 * | 11/2002 | Chang et al. .............. | 709/223 |
| 2003/0055882 A1 * | 3/2003 | Kawamura ................ | 709/203 |
| 2003/0069962 A1 * | 4/2003 | Pandya ..................... | 709/224 |
| 2003/0158936 A1 * | 8/2003 | Knop et al. ................ | 709/224 |
| 2004/0017814 A1 * | 1/2004 | Shimada ................... | 370/395.52 |
| 2004/0042438 A1 * | 3/2004 | Jiang et al. ................ | 370/342 |

OTHER PUBLICATIONS

Cisco Systems, Inc., "Generic Routing Encapsulation (GRE) Tunnel Keepalive," Cisco Release 12.2(8)T, Release 12.0(23)S, pp. 1-8, no available date.
NetScreen Technologies Inc., "High Availability Solutions & Technology for NetScreen's Security Systems," 2003, pp. 1-8.
NetScreen Technologies Inc., "NetScreen-500 Security System Overview," 2003, pp. 1-13.
TeleChoice, "IPSec VPNs—Ready for Prime Time, IPSec VPNs as Core Enterprise Network Solutions," pp. 1-8, no available date.
Cisco Systems, Inc., "Enhanced IGRP," Chapter 40, Internetworking Technologies Handbook, 40-1—40-6, no available date.
O'Reilly & Associates, Inc., "IP Routing, Chapter 4, Enhanced Interior Gateway Routing Protocol (EIGRP)," http://www.oreilly.com/catalog/iprouting/chapter/ch04.html, data retrieved Mar. 22, 2004, pp. 1-28.
Cisco Systems, Inc., "IPSec NAT Transparency," Cisco IOS Release 12.2(13)T, pp. 1-22, no available date.

* cited by examiner

*Primary Examiner*—Jungwon Chang
(74) *Attorney, Agent, or Firm*—Hickman Palermo Truong & Becker LLP

(57) ABSTRACT

A method for monitoring the availability of resources in a network comprises the computer-implemented steps of receiving an activity announcement packet from a node in the network; determining that the node is potentially inactive if no successive activity announcement packet is received from the node within a specified first time period; and determining that the node is inactive if no successive activity announcement packet is received from the node within a specified second time period.

57 Claims, 7 Drawing Sheets

METHOD AND APPARATUS FOR MONITORING THE AVAILABILITY OF NETWORK RESOURCES

FIELD OF THE INVENTION

The present invention generally relates to computer networks. The invention relates more specifically to a method and apparatus for monitoring the availability of network resources.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer networks are an important part of business enterprises. For example, networks that are distributed over a wide geographic area can allow a head office of an enterprise to communicate with remote offices and to share critical data, thereby increasing the overall efficiency of the enterprise. Thus, managing the network, to ensure that it is operating at peak condition, is crucial.

One important aspect of network management involves monitoring the availability of network resources. For example, a broadband connection that links a head office to one or more remote offices, and its endpoint devices such as routers and switches, is typically monitored and managed carefully. Close management is necessary because if the connection between the head office and remote office is not operational, then the remote office, and all the information residing at the remote office, is unavailable as a resource. Therefore, it is important that there be an effective way to monitor the availability of resources in a network.

A virtual private network (VPN) link of a head office to a remote office is a specific example of a network connection that is critical to the proper operation of an enterprise, and that requires careful management. A network manager may be specifically interested in having ways to determine whether network users can access remote resources that are accessed through a VPN. To have this knowledge, the network manager needs to know whether the VPN link is active. Determining whether the VPN link is active normally requires monitoring whether endpoint nodes, such as routers, are active and available.

One approach for monitoring the availability of network resources is the "keepalive" approach. In the keepalive approaches, a server or some other designated unit in the network periodically polls the resource to be monitored by sending a "keepalive" packet to the resource and waiting for a response from the resource. If there is no response, then the server retries the resource for a specified number of times. If there is no response after the specified number of times, then the server gives up and determines that the resource is unavailable.

For example, the Internet Key Exchange protocol, which is defined by IETF RFC 2409 and typically implemented with the IPsec suite of protocols, uses a keepalive approach to maintain IPsec tunnels. Another implementation of the keepalive approach is used to maintain Generic Routing Encapsulation (GRE) tunnels.

This approach, however, can become unmanageable as the network grows larger. The unit designated to do the monitoring must be pre-configured with a database of the addresses of all network resources to be monitored, and the polling configuration for each resource. As the network grows, the database can become unreasonably large and difficult to manage. Further, all changes must be propagated to the database, complicating management. In addition, sending keepalive packets to and from the resources in the network can impose an unreasonable burden on the network as the network grows larger and there are more resources in the network to monitor.

Another approach involves polling, in which a "ping" packet or the equivalent is sent to a remote device. In response to receiving a ping packet, the remote device is required to respond. One implementation of this approach is provided by an IPsec pinging facility in virtual private network monitoring products from Netscreen. However, this approach requires a response from the unit that is monitored. As a result, additional traffic is introduced into the network.

In another approach, "hello" packets may be used, as in the Enhanced Interior Gateway Routing Protocol ("EIGRP") provided by Cisco Systems, Inc., San Jose, Calif. EIGRP hello packets are sent via multicast to all nodes in the network.

Based on the foregoing, there is a clear need for a way of monitor the availability of network resources that is more scalable with the size of the network.

There is a particular need for such a method in large virtual private networks with a head end and many remote sites.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
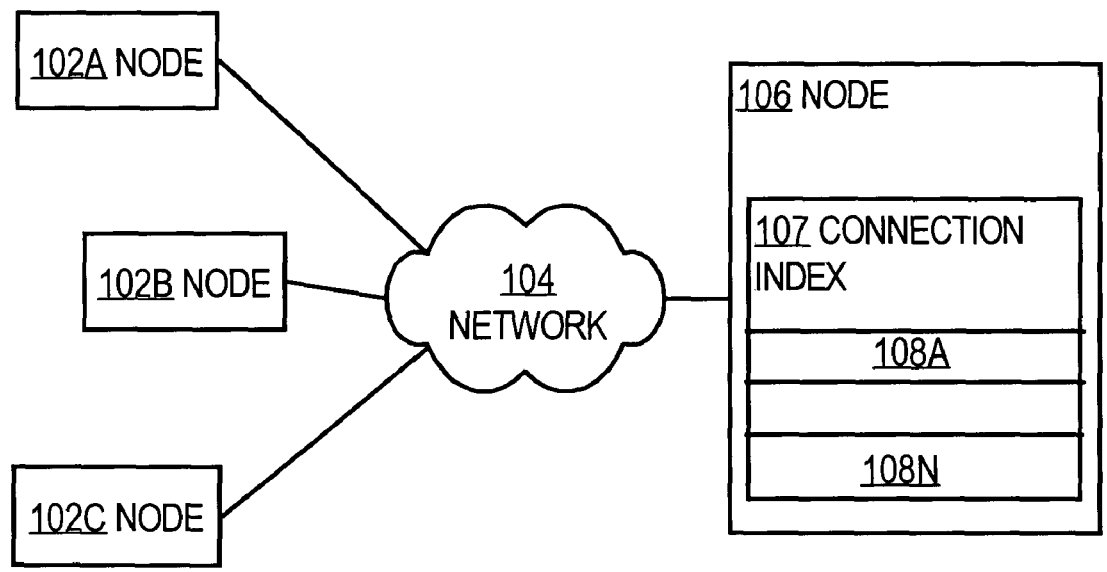
FIG. 1 is a block diagram that illustrates the overview of a system that may be used to practice a method for monitoring the availability of network resources.

A method and apparatus for monitoring the availability of network resources is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural and Functional Overview 3.0 Method of Monitoring the Availability of Network Resources
   3.1 Sending Activity Announcement ("AA") Packets
   3.2 Receiving AA Packets and Managing Timers
   3.3 Tracking the Status of Connections
4.0 Implementation Mechanisms—Hardware Overview
5.0 Extensions and Alternatives

1.0 GENERAL OVERVIEW

As an introduction only, the needs identified in the foregoing Background, and other needs and objects that will become apparent for the following description, are achieved in the present invention, which comprises, in one aspect, a method for monitoring the availability of resources in a network comprising the computer-implemented steps of receiving an activity announcement packet from a node in the network; determining that the node is potentially inactive if no successive activity announcement packet is received from the node within a specified first time period; and determining that the node is inactive if no successive activity announcement packet is received from the node within a specified second time period.

According to one feature of this aspect, the determining steps comprise the steps of initiating a first timer when the activity announcement packet is received from the node; and initiating a second timer if no activity announcement packet from the node has been received again within expiration of the first timer. In another feature, a first time duration associated with the first timer and a second time duration associated with the second timer are configurable. In another feature, the specified first time and the specified second time are configurable. According to another feature, the method further comprises the step of determining that the node or a connection to the node is active if an activity announcement packet is received from the node within the specified first time period. According to another feature, the first and second timers for a node are reset if the node is determined to be active.

In yet another feature, the method further comprises tracking nodes from which activity announcement packets have been received by an index comprising address and connection status information for each such node. In a related feature, the method comprises displaying, in a management application, the connection status of the nodes that are tracked in the index. The method may further comprise periodically removing from the index entries for nodes that have remained inactive for a specified amount of time. In another feature, each activity announcement packet may include the Internet Protocol (IP) address of the node from which the activity announcement packet originated. According to still another feature, the method comprises receiving network performance data, relating to the node, in association with the activity announcement packet.

According to another aspect, a method of monitoring the availability of network resources comprises the computer-implemented steps of sending an activity announcement packet to a specified destination at a regular, configurable interval; and sending network performance data with the activity announcement packet. In one feature of this aspect, the activity announcement packet includes an Internet Protocol (IP) address of a node from which the activity announcement packet originated. In another feature, the activity announcement packet is provided for determining that the node is potentially inactive if no successive activity announcement packet is received from the node within a specified first time period, and for determining that the node is inactive if no successive activity announcement packet is received from the node within a specified second time period.

According to another aspect, a method for monitoring the availability of remote sites in a virtual private network (VPN) comprises the computer-implemented steps of receiving an activity announcement packet from a router in the VPN; determining that the router is potentially inactive if no successive activity announcement packet is received from the router within a specified first time period; and determining that the node is inactive if no successive activity announcement packet is received from the router within a specified second time period.

In certain embodiments, a designated node in a network receives activity announcement packets that are sent from other nodes in the network. The designated node, when it first receives a packet from a node, starts a first timer for that node. If the designated node doesn't receive another packet from that node again within expiration of the first timer, it determines that the connection to the node is possibly inactive and starts a second timer for that node. If the designated node doesn't receive another packet from that node again within expiration of the second timer, then it determines that the connection to the node is inactive. Whenever the designated node receives a packet from a node, it determines that the connection to the node is active and resets the two timers for the node.

In other aspects, the invention encompasses a computer apparatus and a computer-readable medium configured to carry out the foregoing steps.

2.0 STRUCTURAL AND FUNCTIONAL OVERVIEW

FIG. 1 shows a high level overview of a system that may be used to practice a method for monitoring the availability of network resources comprising a network 104, nodes 102A-102C, and designated node 106.

Nodes 102A-102C and designated node 106 may be network elements such as routers, switches, hubs, gateways, personal computers, workstations, and other devices that are or can be connected to or communicate with a network. The system shown in FIG. 1 is just one of many possible different configurations. Other embodiments may include fewer or more system components than those illustrated.

Each of nodes 102A-102C is communicatively coupled to network 104. Designated node 106 is communicatively coupled to network 104. Nodes 102A-102C and designated node 106 each may be communicatively coupled with additional network elements. Thus, nodes 102A-102C can each communicate with designated node 106 through network 104. Other network elements that may be present in the network (not shown in the figure) may be communicatively coupled to node 102A-102C, designated node 106, or network 104.

Network 104 may be a local area network (LAN), wide area network (WAN), one or more internetworks, or any other kind of network or subset thereof. Network 104 may contain additional network infrastructure elements such as routers, switches, etc., and other end station devices such as workstations, printers, servers, etc.

Each node 102A-102C is capable of transmitting packets to a network. Each node 102A-102C is configured to send activity announcement packets to a particular port on designated node 106 periodically. For example, when nodes 102A-102C are routers, each router may comprise logic such as a software agent or application associated with an operating system executed by the router that periodically generates and sends activity announcement packets into the network. At each node 102A-102C, a destination address for the packets, and the interval at which the packets are sent, are configurable. For example, the destination address is set to the address of designated node 106.

Designated node 106 is configured to listen for and receive activity announcement packets at a particular port, manage timers for each node based on whether activity announcement packets were received from each node, and determining the status of the connection from designated node 106 and each node 102A-102C based on when activity announcement packets were received in relation to the timers. For example, node 106 may be a router that comprises logic such as a software agent or application associated with an operating system executed by the router that processes activity announcement packets and timers.

Figure 2:
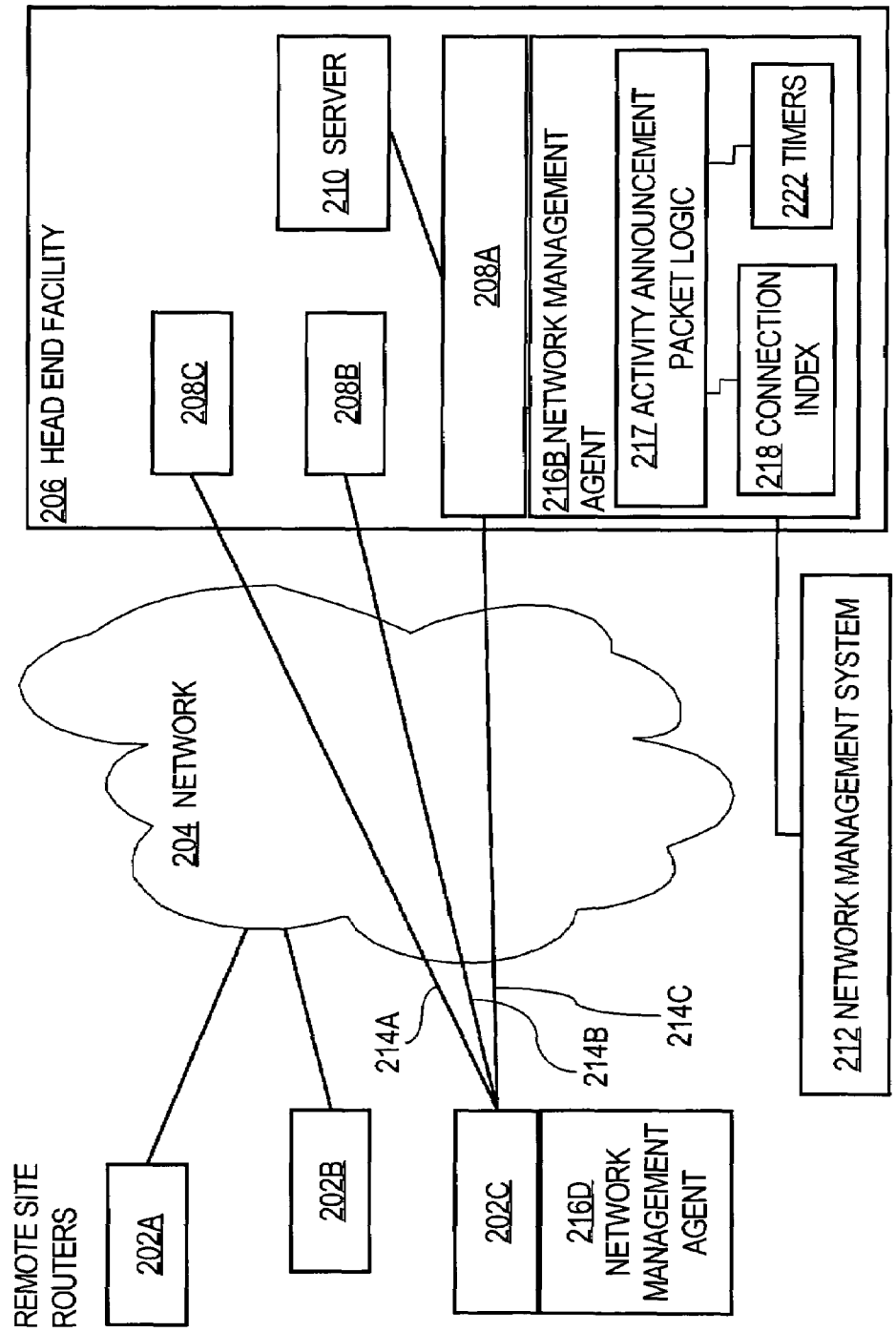
FIG. 2 is a block diagram that illustrates an overview of a virtual private network that may be used to practice an embodiment of a method for monitoring the availability of network resources.

FIG. 2 is a block diagram of a system that may be used to practice an embodiment of a method of monitoring the availability of network resources. One or more remote site routers 202A-202C are communicatively coupled to head end facility 206 through network 204. In one specific arrangement, network 204 is an untrusted network or public network such as the Internet, and remote site routers 202A-202C cooperate with head end routers 208A, 208B, 208C at head end facility 206 to establish one or more virtual private network tunnels through the network. Remote site routers 202A-202C and head end facility 206 are arranged in a hub-and-spoke or star topology in which the head end facility is the hub.

Network 204 can be a public network, private network, or a combination thereof. The terms "remote" and "head end" are used as examples only, and embodiments do not require any particular amount of physical separation between a first node and a designated node. For example, routers 202A-202C and head end facility 206 may be logically separated but relatively geographically close.

Each remote site router 202A-202C may be communicatively coupled with one or more local network end stations, such as workstations, personal computers, switches, etc. At any given time, one of the head end routers 208A-208C of head end facility 206 is designated for management purposes. Network end station elements such as server 210 and network management station 212 may be communicatively coupled to head end routers 208A-208C.

In a VPN arrangement, each remote site router 202A-202C communicates with head end routers 208A-208C to establish and use one or more VPN tunnels 214A, 214B, and 214C. A VPN tunnel is a secure, encrypted communication path between the remote site router and the head end router, passing through the public network 204. Each remote site router 202A-202C can configured to be able to establish one of the tunnels 214B-214C with head end routers 208B-208C, in the event of a failure in tunnel 214A to head end router 208A.

Each of the remote site routers 202A-202C and head end routers 208A-208C may run network management software, such as a network management agent 216A, 216B. An example of network management software that can execute on routers 202A-202C, 208A-208C is Service Assurance Agent ("SAA"), from Cisco Systems, Inc., San Jose, Calif.

For example, network management agent 216A is installed on remote site router 202C, and is configured to send network performance data to network management station 212 at head end facility 206 through head end router 208A. Network management agent 216B is installed on head end router 208A and is configured for receiving network performance data at the head end. Head end routers 208A-208C also may be configured to receive network performance data and forward the data to a network management station 212.

3.0 METHOD OF MONITORING AVAILABILITY OF NETWORK RESOURCES

3.1 Sending Activity Announcement ("AA") Packets

According to one embodiment, each of the nodes 102A, 102B, and 102C performs a process of periodically sending activity announcement packets. The process comprises generating and sending an activity announcement packet at a regular interval. A typical interval is every sixty (60) seconds, although in certain embodiments the interval duration may be configurable by a network administrator or software application.

Each activity announcement packet is sent by unicast to a specified or designated destination node, and each node is configured to send activity announcement packets to a particular port of the designated node. For example, in FIG. 1, node 106 is the designated node, and nodes 102A, 102B, 102C all send activity announcement packets to node 106.

In one embodiment, activity announcement packets are sent using the UDP protocol. In other embodiments, other protocols may be used to send activity announcement packets. Each activity announcement packet contains information that identifies the node from which the packet originated. In some embodiments, an originating node identifier comprises an IP address of the originating node. The activity announcement packets may be encrypted or otherwise formatted in a proprietary manner, to prevent forging, spoofing, or undesired use by other parties or systems. Authentication based on certificates installed at the client may also be used to prevent forging, spoofing, or undesired use by other parties or systems.

In another embodiment, using the system of FIG. 2, a process of periodically sending activity announcement packets is performed out by remote site routers 202A-202C. In this embodiment, the remote site routers may be configured to send the packets through the tunnels 214A-214C, or directly through network 204. For example, when a VPN tunneling arrangement is used, logic in network management agent 216A may cause router 202C to send periodic activity announcement packets through VPN tunnel 214A to router 208C. In this case, the head end router 208C serves both as a VPN tunnel endpoint and as a designated node for receiving activity announcement packets. Alternatively, logic in network management agent 216A may cause router 202C to send periodic activity announcement packets through VPN tunnel 214B to the same designated node, router 208C; however, because the VPN tunnel 214B terminates at router 208B, the activity announcement packets first pass through router 208B before arriving at the designated node.

3.2 Receiving Activity Announcement Packets and Managing Timers

Figure 3:
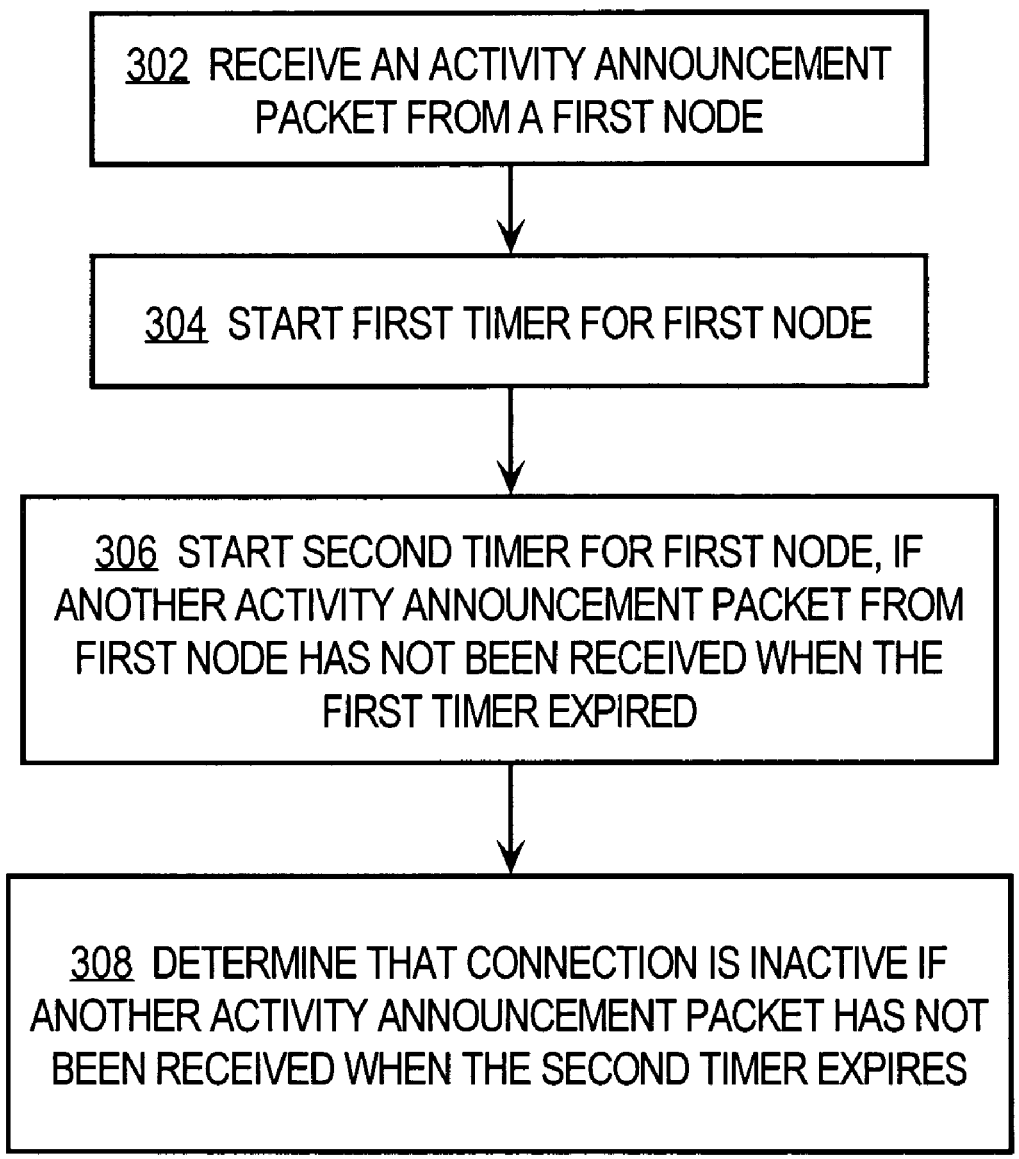
FIG. 3 is a flow diagram that illustrates an overview of the method for monitoring the availability of network resources.

FIG. 3 is a flow diagram that shows an overview of a method for monitoring the availability of network resources. The method of FIG. 3 may be performed, in some embodiments, by a designated node 106, by head end routers 208A-208C, by network management agent 216B, etc.

In block 302, an activity announcement packet is received from a first node. In one embodiment, the received activity announcement packet contains an identifier of the first node. For example, in some embodiments, the identifier is an IP address of first node.

At block 304, a first timer for the first node is started. For example, because the designated node 106 has just received an activity announcement packet from the first node, the designated node assumes that the connection between the designated node and the source node of the activity announcement packet is active.

In one embodiment, to track the status of a connection as active or inactive, the designated node may mark an index 218 of nodes or connections with information indicating whether a link to a node, or another node, is active or inactive. For example, index 218 may comprise an array of entries 220A-220N, in which each entry is uniquely associated with a node to which the designated node is connected, or a link from the designated node to another node. Thus, a particular ordinal position in the index 218 contains information uniquely indicating whether a particular node is active or inactive. Before starting the first timer, the designated node marks the array element associated with the first node as active.

Further, the designated node maintains a timer for each other node in the network from which the designated node receives an activity announcement packet.

At block 306, if another activity announcement packet from the first node has not been received by the time that the first timer expired, then the process determines that the first node is potentially inactive, and a second timer is started for the first node.

In block 308, the process determines that a connection of the first node to the designated node is inactive, if another activity announcement packet has not been received when the second timer expires.

The term "timer" herein is intended to broadly refer to any method or mechanism for measuring a specified period of time.

Thus, in the process of FIG. 3 the first timer measures a period of time within which the designated node expects to receive successive activity announcement packets. The second timer is activated when the first node, or a link between the first node and the designated node, is determined to be possibly inactive because of the failure to receive a subsequent activity announcement packet. If the second timer expires without receipt of another activity announcement packet, then the link or node is determined to be definitely inactive.

Figure 4A:
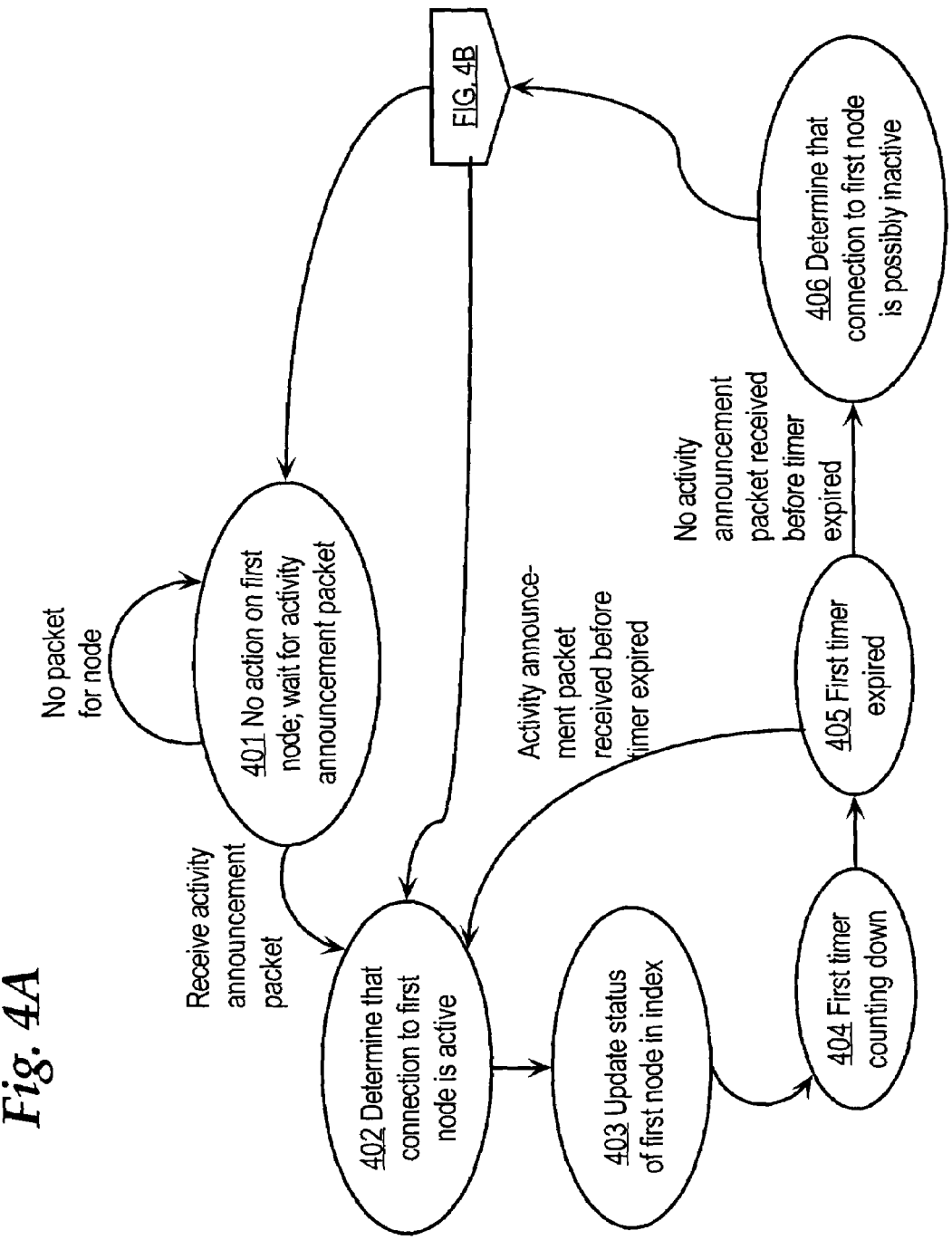
FIG. 4A is a state diagram that illustrates the method for monitoring the availability of network resources as applied to one node.
Figure 4B:
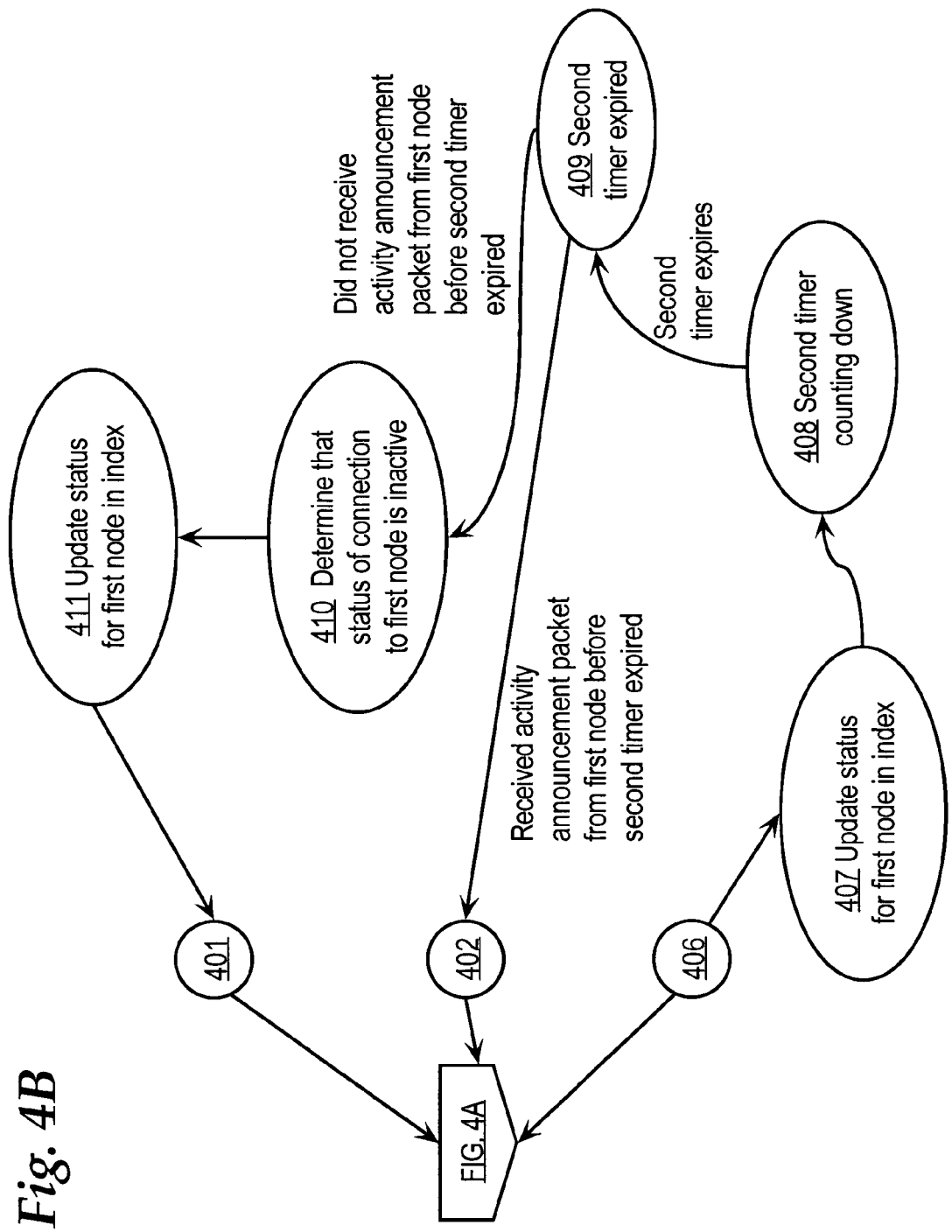
FIG. 4B is a state diagram showing additional states of the method of FIG. 4A.

FIG. 4A and FIG. 4B is a state diagram that illustrates an embodiment for the process of receiving the activity announcement packets, managing the timers, and determining the status of the connection to the nodes. The states of FIG. 4A, FIG. 4B represent processing states of a designated node, such as node 106 of FIG. 1 or router 208A of FIG. 2. For purposes of illustrating a clear example, the description below refers to node 106.

Initially, the designated node is in state 401, which is the waiting state. In the waiting state, the designated node 106 waits for any packet from the first node to arrive. The designated node 106 remains in the waiting state 401 with respect to a first node if the first node does not exist yet or the connection to it has been determined to be inactive. The designated node 106 remains continuously in the waiting state with respect to the first node as long as no activity announcement packet from the first node has been received.

While in state 401, if an activity announcement packet from the first node has been received, then the designated node transitions to state 402. In state 402, the designated node 106 determines that the connection to the first node is active. Also, in state 402, the designated node 106 resets the first and second timers for the first node. The designated node 106 then transitions automatically to state 403, in which the designated node updates the status of the connection to first node in the index of nodes.

Once the index update is complete, the designated node 106 automatically transitions to state 404, in which a first timer for the first node is initiated and begins counting down. Once the first timer for the first node expires, the designated node 106 transitions to the first timer expiration state 405. At state 405, the designated node 106 determines whether another activity announcement packet from the first node has been received before the designated node transitioned to state 405, that is, before the first timer expired.

If another activity announcement packet from the first node did arrive, then the process transitions back to state 402, at which the connection to the first node is determined to be active. Also, in state 402, the designated node 106 resets the first and second timers for the first node. The designated node 106 then transitions to state 403, in which the status of the connection to the first node is updated, and then the first timer is initiated again at state 404. Thus, as long as the first node continuously and periodically sends activity announcement packets according to the process described herein and designated node 106 receives the activity announcement packets, the loop described above occurs. Further, the designated node maintains the index entry for the connection to first node as active.

If another activity announcement packet did not arrive, however, then the process transitions from state 405 to state 406. At state 406, the process determines that the connection to first node is possibly inactive.

Referring now to FIG. 4B, the process then transitions to state 407, in which the status of the connection to the first node is updated in the appropriate index entry. Then the process transitions to state 408, where the second timer for first node is initiated and the countdown begins.

When the second timer expires, the process transitions to second timer expiration state 409. In state 409, the designated node 106 determines if another activity announcement packet from the first node arrived before transition to state 409, that is, before the second timer expired. If another packet did arrive, then the process transitions to state 402, in which the first node and the connection to the first node is determined to be active. Also, in state 402, the designated node 106 resets the first and second timers for the first node.

If another packet did not arrive, then the process transitions to state 410, in which the connection to the first node is determined to be inactive. The process then transitions to state 411, in which the status of the connection to the first node is updated in the index. For example, an entry 220A of index 218 is set to inactive. The process then transitions to state 401. As described above, state 401 is a waiting state.

Thus, a designated node such as node 106 or routers 208A-208C maintains first and second timers for each node 102A-102C, 202A-202C. In some embodiments, the length of each first timer is the same for all nodes, and the length of each second timer is the same for all nodes. In some embodiments, the timer lengths may be configured at the designated node 106 as global settings.

In certain embodiments, to receive activity announcement packets, the designated node 106 listens for activity announcement packets at a particular port. When an activity announcement packet arrives on the particular port, the designated node 106 extracts the identifier of the node from which the packet originated. The identifier is used to determine which entry 220A-220N of index 218 may require updating.

The processes of sending and receiving activity announcement packets described herein provide a method of monitoring network resource availability that is scalable in several ways. First, because the activity announcement packets are sent only in one direction in the network, and no response is needed, far less network traffic is generated, reducing the traffic burden on intervening links and nodes. Second, only the nodes that are monitored send activity announcement packets; therefore, there is no need to configure the designated node or head end facility router with polling information for every node in the network. Third, because the index of nodes or connections in the network is built automatically and updated as activity announcement packets from the nodes are received, there is no need to know the addresses for all nodes in advance.

Consequently, there is no need for advance configuration of the designated node with all addresses of all nodes in the network, and there is little need for direct management of the index by the user. In addition, the techniques herein are more adaptable to changes in the network, such as nodes that become inactive for a long time, or nodes that change IP addresses. If a node is heard from once and continues to report periodically, then it is deemed an active system and no further intervention is required. Intervention is required only if a node or system no longer provides activity announcement packets.

Specific embodiments may be used in the monitoring of large-scale VPNs or any network with a large number of end systems.

3.3 Tracking the Status of Connections

In one embodiment, designated node 106 is responsible for tracking the status of each connection from a monitored node 102A-102C to the designated node 106. The designated node 106 tracks status by maintaining a connection index 107. In some embodiment, the index 107 is in a plain text file format. In other embodiments, other file formats or data structures may be used.

The index contains an entry 108A-108N for each node from which activity announcement packets are received. Each entry 108A-108N contains the identifier of a node and the status of the connection to that node from the designated node 106. In some embodiments, the identifier is the IP address of the node. The status of the connection can be active, possibly inactive, or inactive.

When the designated node 106 updates the status of a connection to a node, e.g., node 102A, the designated node first searches the index 107 to see if an entry 108A-108N for that node is already in the index. If node 102A already has an entry 108A in the index, then the designated node 106 updates the status value for that entry. If the node 102A does not have an entry in the index 107, a new entry is created.

In one embodiment, the designated node 106 is also responsible for providing the information contained in the index to a user or external application. Providing, in this context, may comprise displaying in a graphical user interface, displaying in a command-line interface, presenting in another form of output, programmatically providing, etc. In some embodiments, the index 107 and entries 108A-108N may be displayed in a graphical user interface window of an application that can read the index 107, format the data contained in entries 108A-108N, and display the data in a graphical user interface window or other form of output. In another embodiment, the data in the index is formatted for display in a web browser. The Multi Router Traffic Grapher (MTRG), which formats "live" network traffic data for viewing in a web browser, is an example of a tool for formatting network data for display in a web browser that can be used to display connection index 107.

The techniques herein may further comprise periodically removing from the index entries for nodes that have remained inactive for a specified amount of time. For example, periodically a network management agent or other process may scan the index and remove entries for nodes that are known to be inactive. As a specific example, nodes that have been taken permanently off-line or are off-line for repairs can be periodically flushed from the index after a configurable time period.

In the description above, the term "status" may refer to the status of the connection from a node to the designated node, rather than to the status of the node itself. Reference to connection status is performed because the connections between the nodes generally are the primary concern of the embodiments. If a connection to a resource is down, the resource is unavailable, just as if the path to the resource is working but the resource itself is not operational. Thus, the connection to a node is as important as whether the node itself is operating. However, in alternative embodiments, "status" may refer to the status of a node.

4.0 IMPLEMENTATION MECHANISMS

Hardware Overview

Figure 5:
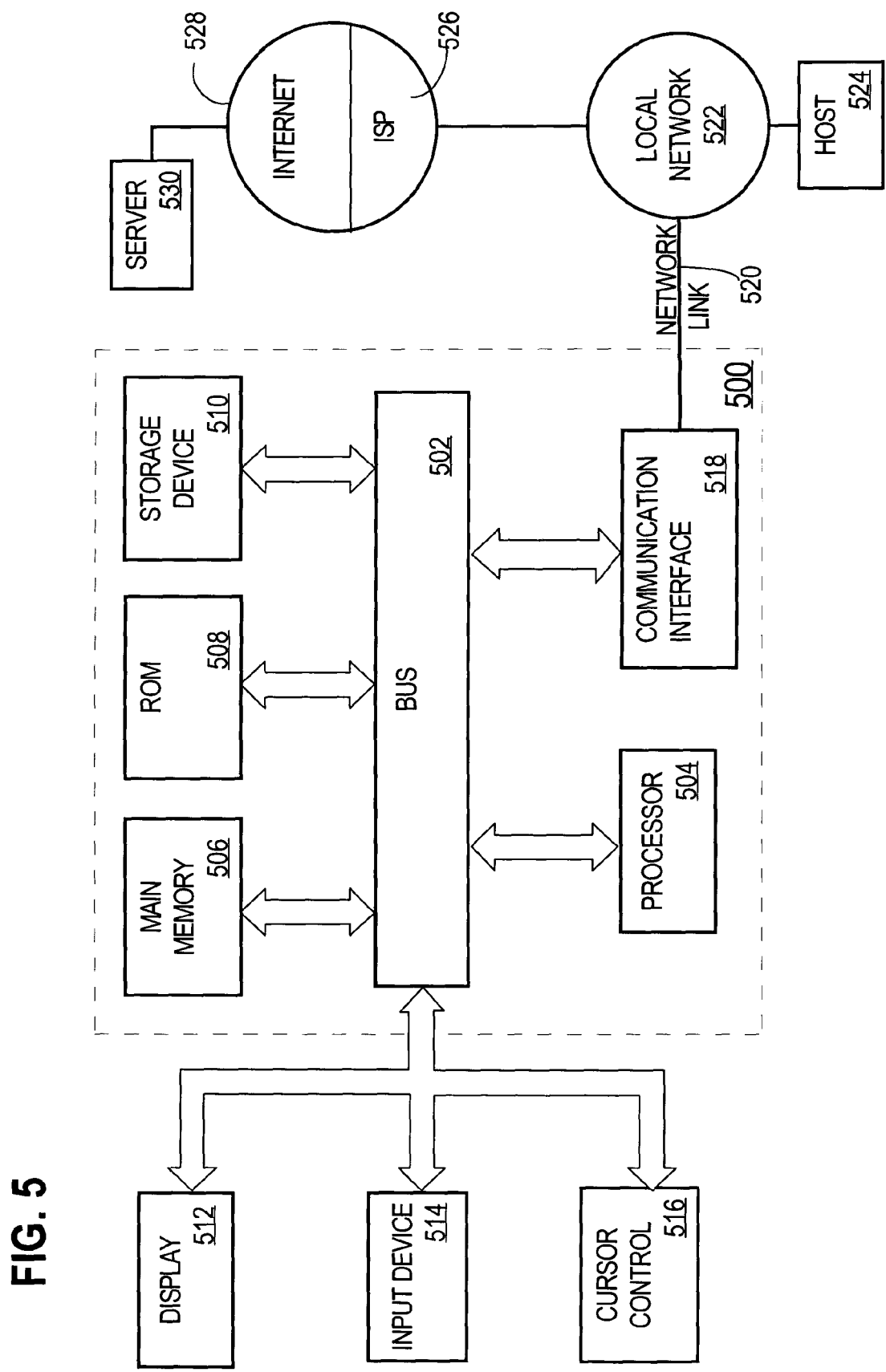
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for monitoring the availability of network resources. According to one embodiment of the invention, monitoring of the availability of network resources is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any medium that participates in providing instructions to processor 504 for execution. Such a medium may take many forms, including but not limited to, non-volatile storage media, volatile storage media, and transmission media. Non-volatile storage media includes, for example, optical or magnetic disks, such as storage device 510. Volatile storage media includes dynamic memory, such as main memory 506. Transmission media includes coaxial cables, copper wire and fiber optics, including the wires that comprise bus 502.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other storage medium from which a computer can read.

Various forms of computer readable storage media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that use digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that use digital data streams.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for monitoring of availability of network resources as described herein.

Processor 504 may execute the received code as it is received, and/or stored in storage device 510, or other non-volatile storage for later execution. In this manner, computer system 500 may obtain application code.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Entries in an index such as index 107 or index 218 may also have a field for a timestamp that represents the time that the status for an entry was last updated. Using the timestamp value, a management application of network management station 212 can determine or assist a user in determining how long a node has remained inactive. To prevent the index 107, 218 from becoming too large over time, the index may be periodically purged of entries for nodes that have remained inactive for a specified amount of time, based on the timestamp values of the entries.

Further, the tracking process may be extended using logging, which enables a user or application to keep track of the status of nodes over time. The use of logging may assist a user or application to detect potential problem areas in the network.

Further, in the sending process, a monitored node or remote node may send network performance data with the activity announcement packet to the designated node. In some embodiments, however, the nodes are also responsible for sending network performance data to a network management station, such as network management station 212 in the embodiment of FIG. 2. The designated node separates the activity announcement packet from the network performance data and forward the network performance data to the network management station. Network performance data may comprise link performance data or statistics, or node or device information. Network performance data may include information such as link latency, roundtrip delay, packet loss statistics, call blocking statistics or other call-level information, etc. In an embodiment in which network management agents 216A, 216B comprise Cisco Service Assurance Agent, the network performance data may comprise any or all data that is generated by the SAA.

Further, the sending process may provide for authentication in the activity announcement packet. In the embodiments described above, there may be no way for the designated node to verify whether an activity announcement packet truly came from a node within the network or from an outside node that is spoofing the address of a node within the network. As a consequence, there may be entries in the index with values that falsely indicate an active status. The problem of false active entries may be solved, in some embodiments, by including a MAC address of the source node in the activity announcement packet. Generally, MAC addresses are not spoofed as easily as source network addresses. In this approach, the designated node checks a unique number, such as the MAC address, the hardware serial number, or some other device-unique identifier, to verify that the packet is from a node within the network before continuing with the process.

Encryption technologies, such as Secure Sockets Layer (SSL), IP security (IPsec), and certificates, may also be used to provide authentication.

Certain embodiments herein are used to monitor connections between a designated node and the monitored nodes in one direction of network traffic only. Usually, if a connection is active in one direction, then it should be active in the other direction as well. That is not always the case, however. In an alternative embodiment, one or more connections are monitored in a bi-directional manner. In this approach, for example, both network management agent 216A of router 202C and network management agent 216B of router 208A concurrently perform monitoring of network resource availability. Each of the network management agents 216A, 216B may carry out the processes of FIG. 3, FIG. 4.

Figure 4C:
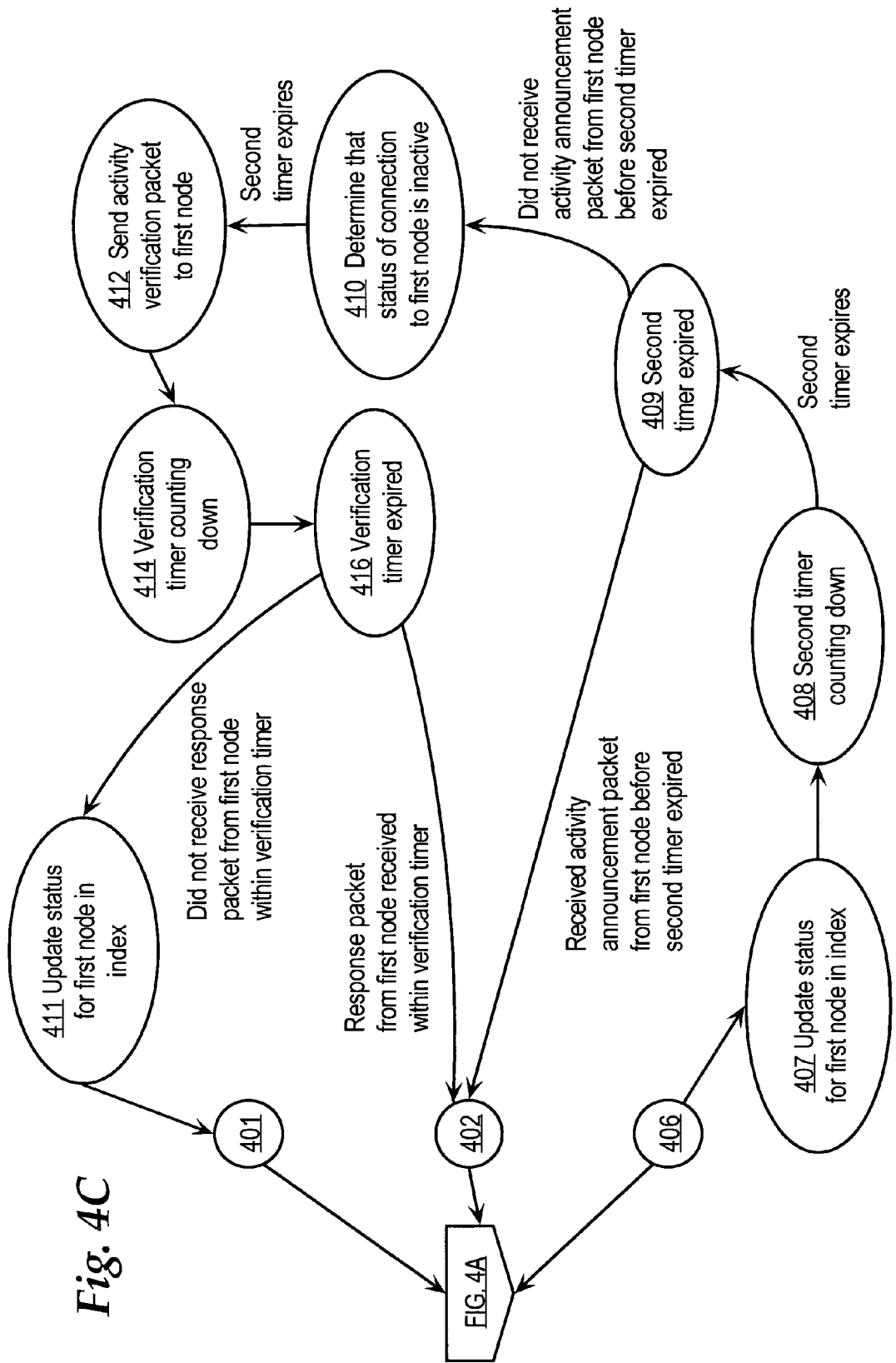
FIG. 4C is a state diagram showing additional states of an alternative embodiment of the method of FIG. 4A.

In certain embodiments, designated node 106 updates the connection index soon after a node has been determined to be inactive. In an alternative embodiment, the just-determined inactive status of a node may be verified before the connection index is updated. In this approach, designated node 106 may be configured to send an activity verification packet to a node that has been determined to be inactive and to wait for a response from the node. FIG. 4C illustrates the additional states of an alternative embodiment, which uses this approach, of the method of FIG. 4A, with FIG. 4C replacing FIG. 4B in this embodiment. From state 410, in which a node has been determined to be inactive, designated node 106 proceeds to 412. In state 412, designated node 106 sends an activity verification packet to the node that has just been determined to be inactive. From state 412, designated node 106 transitions to state 414, in which a verification timer for the node is initiated and begins counting down. The verification timer may be a new user-configurable parameter that is similar in operation to the first and second timers. Alternatively, the verification timer may use a duration value of the first timer or the second timer. When the verification timer expires, designated node 106 transitions to verification timer expiration state 416. If a response packet is received within expiration of the verification timer, designated node 106 transitions to state 402, where the node will be determined to be active and the verification timer will be reset. If a response packet has not been received within expiration of the verification timer, then designated node 106 transitions to state 411, where the status of the node in the index is updated to inactive. This approach, which is entirely optional, may prevent an incorrect determination of a node as inactive due to delayed activity announcement packets. If this approach is not used, then FIG. 4C may be ignored and FIG. 4B remains the illustration of additional states of the method of FIG. 4A.

What is claimed is:

1. A method for monitoring the availability of resources in a network, comprising the computer-implemented steps of:
   receiving an activity announcement packet from one node of a plurality of nodes in the network;
   determining that the node is potentially inactive if no successive activity announcement packet is received from the node within a specified first time period;
   determining that the node is inactive if no successive activity announcement packet is received from the node within a specified second time period; and
   detecting that the node or a connection to the node is active if an activity announcement packet is received from the node within the specified first time period;
   wherein the activity announcement packet is sent only by specific nodes of the plurality of nodes in the network, and does not require a response.

2. A method as recited in claim 1, wherein the determining steps comprise the steps of:
   initiating a first timer when the activity announcement packet is received from the node; and
   initiating a second timer if no activity announcement packet from the node is received again within expiration of the first timer.

3. A method as recited in claim 2, wherein a first time duration associated with the first timer and a second time duration associated with the second timer are configurable.

4. A method as recited in claim 2, further comprising:
   resetting the first and second timers.

5. A method as recited in claim 1, further comprising the steps of:
   sending an activity verification packet to a node that has been determined to be inactive;
   determining that the node is active if a response packet from the node is received within expiration of a specified verification timer.

6. A method as recited in claim 1, wherein the specified first time and the specified second time are configurable.

7. A method as recited in claim 1, further comprising the step of tracking nodes from which activity announcement packets have been received by an index comprising address and connection status information for each such node.

8. A method as recited in claim 7, further comprising the step of displaying, in a management application, the connection status of the nodes that are tracked in the index.

9. A method as recited in claim 8, further comprising the step of periodically removing from the index entries for nodes that have remained inactive for a specified amount of time.

10. A method as recited in claim 1, wherein each activity announcement packet includes the Internet Protocol (IP) address of the node from which the activity announcement packet originated.

11. A method as recited in claim 1, further comprising the step of receiving network performance data, relating to the node, in association with the activity announcement packet.

12. A method as recited in claim 1, further comprising:
    configuring a destination address to which a node sends the activity announcement packets.

13. A method as recited in claim 1, further comprising:
    configuring an interval by which a node sends successive activity announcement packets.

14. A method as recited in claim 1, further comprising:
    formatting the activity announcement packets in a proprietary manner.

15. A method as recited in claim 1, further comprising:
    authenticating the activity announcement packets.

16. The method of claim 1, further comprising:
    monitoring only selected nodes within the network.

17. A method of monitoring the availability of network resources, comprising the computer-implemented steps of:
    sending an activity announcement packet to a specified destination at a regular, configurable interval;
    sending network performance data with the activity announcement packet;
    wherein the activity announcement packet includes an Internet Protocol (IP) address of a node from which the activity announcement packet originated; and
    detecting that the node or a connection to the node is active if an activity announcement packet is received from the node within the specified first time period;
    wherein the activity announcement packet is sent only by specific nodes of a plurality of nodes in the network, and does not require a response.

18. A method as recited in claim 17, wherein the activity announcement packet is provided for determining that the node is potentially inactive if no successive activity announcement packet is received from the node within a specified first time period, and for determining that the node is inactive if no successive activity announcement packet is received from the node within a specified second time period.

19. A method for monitoring the availability of remote sites in a virtual private network (VPN), comprising the computer-implemented steps of:
receiving an activity announcement packet from a router that is one of a plurality of nodes in the VPN;
determining that the router is potentially inactive if no successive activity announcement packet is received from the router within a specified first time period;
determining that the node is inactive if no successive activity announcement packet is received from the router within a specified second time period; and
detecting that the router and the connection to the router is active if an activity announcement packet is received from said router within the specified first time period or within the specified second time period;
wherein the activity announcement packet is sent only by specific nodes of the plurality of nodes in the network, and does not require a response.

20. A method as recited in claim 19, wherein the determining steps comprise the steps of:
initiating a first timer when the activity announcement packet is received from the router; and
initiating a second timer if no activity announcement packet from the router is received again within expiration of the first timer.

21. A method as recited in claim 20, wherein the first timer and second timer are configurable.

22. A method as recited in claim 20, further comprising the step of determining that the router and the connection to said router is inactive if no activity announcement packet from said router is received after the second timer expires.

23. A method as recited in claim 20, further comprising the step of determining that the router and the connection to said router is possibly inactive if no activity announcement packet from said router is received after the first timer expires.

24. A method as recited in claim 19, further comprising the step of tracking the routers from which activity announcement packets have been received by maintaining an index comprising an address and connection status information for each such router.

25. A method as recited in claim 24, further comprising the step of displaying, in a management application, the connection status information for the routers that are tracked in the index.

26. A method as recited in claim 19, wherein the steps of the method are performed by a network management agent executed by a designated router in the network.

27. A method as recited in claim 19, wherein the steps of the method are performed by a network management agent executed by the router.

28. A method as recited in claim 19, further comprising the step of receiving network performance data, relating to the router, in association with the activity announcement packet.

29. An apparatus for monitoring the availability of network resources, comprising:
means for receiving an activity announcement packet from one node of a plurality of nodes in the network;
means for determining that the node is potentially inactive if no successive activity announcement packet is received from the node within a specified first time period;
means for determining that the node is inactive if no successive activity announcement packet is received from the node within a specified second time period; and
means for determining that the node or a connection to the node is active if an activity announcement packet is received from the node within the specified first time period; wherein the activity announcement packet is sent only by specific nodes of the plurality of nodes in the network, and does not require a response.

30. An apparatus as recited in claim 29, wherein the determining means comprise:
means for initiating a first timer when the activity announcement packet is received from the node; and
means for initiating a second timer if no activity announcement packet from the node is received again within expiration of the first timer.

31. An apparatus as recited in claim 30, wherein a first time duration associated with the first timer and a second time duration associated with the second timer are configurable.

32. An apparatus as recited in claim 29, wherein the specified first time and the specified second time are configurable.

33. An apparatus as recited in claim 29, further comprising means for determining that the node or a connection to the node is active if an activity announcement packet is received from the node within the specified first time period.

34. An apparatus as recited in claim 29, further comprising means for tracking nodes from which activity announcement packets have been received by an index comprising address and connection status information for each such node.

35. An apparatus as recited in claim 34, further comprising means for displaying, in a management application, the connection status of the nodes that are tracked in the index.

36. An apparatus as recited in claim 35, further comprising means for periodically removing from the index entries for nodes that have remained inactive for a specified amount of time.

37. An apparatus as recited in claim 29, wherein each activity announcement packet includes the Internet Protocol (IP) address of the node from which the activity announcement packet originated.

38. An apparatus as recited in claim 29, further comprising means for receiving network performance data, relating to the node, in association with the activity announcement packet.

39. An apparatus for monitoring the availability of network resources, comprising;
a processor;
one or more stored sequences of instructions that are accessible to the processor and which, when executed by the processor, cause the processor to carry out the steps of:
receiving an activity announcement packet from one node of a plurality of nodes in the network;
determining that the node is potentially inactive if no successive activity announcement packet is received from the node within a specified first time period;
determining that the node is inactive if no successive activity announcement packet is received from the node within a specified second time period; and
detecting that the node or a connection to the node is active if an activity announcement packet is received from the node within the specified first time period;
wherein the activity announcement packet is sent only by specific nodes of the plurality of nodes in the network, and does not require a response.

40. An apparatus as recited in claim 39, wherein the determining steps comprise the steps of:
   initiating a first timer when the activity announcement packet is received from the node; and
   initiating a second timer if no activity announcement packet from the node is received again within expiration of the first timer.

41. An apparatus as recited in claim 40, wherein a first time duration associated with the first timer and a second time duration associated with the second timer are configurable.

42. An apparatus as recited in claim 39, wherein the specified first time and the specified second time are configurable.

43. An apparatus as recited in claim 39, further comprising the step of tracking nodes from which activity announcement packets have been received by an index comprising address and connection status information for each such node.

44. An apparatus as recited in claim 43, further comprising the step of displaying, in a management application, the connection status of the nodes that are tracked in the index.

45. An apparatus as recited in claim 44, further comprising the step of periodically removing from the index entries for nodes that have remained inactive for a specified amount of time.

46. An apparatus as recited in claim 39, wherein each activity announcement packet includes the Internet Protocol (IP) address of the node from which the activity announcement packet originated.

47. An apparatus as recited in claim 39, further comprising the step of receiving network performance data, relating to the node, in association with the activity announcement packet.

48. A computer-readable storage medium carrying one or more sequences of instructions for monitoring the availability of network resources, wherein the execution of the one or more sequences of instructions by one or more processors causes the one or more processors to perform the steps of:
   receiving an activity announcement packet from one node of a plurality of nodes in the network;
   determining that the node is potentially inactive if no successive activity announcement packet is received from the node within a specified first time period;
   determining that the node is inactive if no successive activity announcement packet is received from the node within a specified second time period; and
   detecting that the node or a connection to the node is active if an activity announcement packet is received from the node within the specified first time period;
   wherein the activity announcement packet is sent only by specific nodes of the plurality of nodes in the network, and does not require a response.

49. A computer-readable storage medium as recited in claim 48, wherein the determining steps comprise the steps of:
   initiating a first timer when the activity announcement packet is received from the node; and
   initiating a second timer if no activity announcement packet from the node is received again within expiration of the first timer.

50. A computer-readable storage medium as recited in claim 49, wherein a first time duration associated with the first timer and a second time duration associated with the second timer are configurable.

51. A computer-readable storage medium as recited in claim 48, wherein the specified first time and the specified second time are configurable.

52. A computer-readable storage medium as recited in claim 48, further comprising the step of tracking nodes from which activity announcement packets have been received by an index comprising address and connection status information for each such node.

53. A computer-readable storage medium as recited in claim 52, further comprising the step of displaying, in a management application, the connection status of the nodes that are tracked in the index.

54. A computer-readable storage medium as recited in claim 53, further comprising the step of periodically removing from the index entries for nodes that have remained inactive for a specified amount of time.

55. A computer-readable storage medium as recited in claim 48, wherein each activity announcement packet includes the Internet Protocol (IP) address of the node from which the activity announcement packet originated.

56. A computer-readable storage medium as recited in claim 48, further comprising the step of receiving network performance data, relating to the node, in association with the activity announcement packet.

57. A method for monitoring the availability of resources in a network, comprising the computer-implemented steps of:
   receiving an activity announcement packet from one node of a plurality of nodes in the network;
   determining that the node is potentially inactive if no successive activity announcement packet is received from the node within a specified first time period;
   determining that the node is inactive if no successive activity announcement packet is received from the node within a specified second time period; and
   tracking nodes from which activity announcement packets have been received by an index comprising address and connection status information for each such node;
   wherein the activity announcement packet is sent only by specific nodes of the plurality of nodes in the network, and does not require a response.

* * * * *